United States Patent
Zhu et al.

(10) Patent No.: US 11,132,224 B2
(45) Date of Patent: Sep. 28, 2021

(54) FINE GRANULARITY REAL-TIME SUPERVISION SYSTEM BASED ON EDGE COMPUTING

(71) Applicant: Essence Information Technology Co., Ltd, Tianjin Development District (CN)

(72) Inventors: Li Zhu, Tianjin Development District (CN); Chenyu Zhang, Tianjin Development District (CN); Ying Lin, Tianjin Development District (CN); Hao Xu, Tianjin Development District (CN); Jian Sun, Tianjin Development District (CN); Zhentao Zhang, Tianjin Development District (CN); Xiyong Zhu, Tianjin Development District (CN); Zexin Wu, Tianjin Development District (CN); NianXiang Zeng, Tianjin Development District (CN); Xuesong Liu, Tianjin Development District (CN)

(73) Assignee: Essence Information Technology Co., Ltd, Tianjin Development (CN)

( * ) Notice: Subject to any disclaimer, the term of this patent is extended or adjusted under 35 U.S.C. 154(b) by 0 days.

(21) Appl. No.: 17/120,142

(22) Filed: Dec. 12, 2020

(65) Prior Publication Data
US 2021/0096911 A1    Apr. 1, 2021

(30) Foreign Application Priority Data
Aug. 17, 2020 (CN) .......................... 202010825020.8

(51) Int. Cl.
| | |
|---|---|
| G06F 9/48 | (2006.01) |
| G06F 16/2455 | (2019.01) |
| G06N 20/00 | (2019.01) |
| G06F 9/50 | (2006.01) |
| G06K 9/00 | (2006.01) |
| G06N 5/04 | (2006.01) |
| H04N 7/18 | (2006.01) |

(52) U.S. Cl.
CPC .......... *G06F 9/4881* (2013.01); *G06F 9/5044* (2013.01); *G06F 16/24568* (2019.01); *G06K 9/00718* (2013.01); *G06K 9/00765* (2013.01); *G06K 9/00771* (2013.01); *G06N 5/04* (2013.01); *G06N 20/00* (2019.01); *H04N 7/18* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 2020/0364588 A1* | 11/2020 | Knox | G06K 9/6268 |
| 2021/0020041 A1* | 1/2021 | Yang | H04N 7/181 |

* cited by examiner

Primary Examiner — Heather R Jones

(57) ABSTRACT

The present invention relates to the field of security technology, and in particular to a fine granularity real-time supervision system based on edge computing. A fine granularity real-time supervision system based on edge computing is provided, comprising: an intelligent video monitoring device, an edge computing module, an edge computing node, and a cloud computing center. The system can reduce the redundant information of the system and realizes fine granularity management.

6 Claims, 1 Drawing Sheet

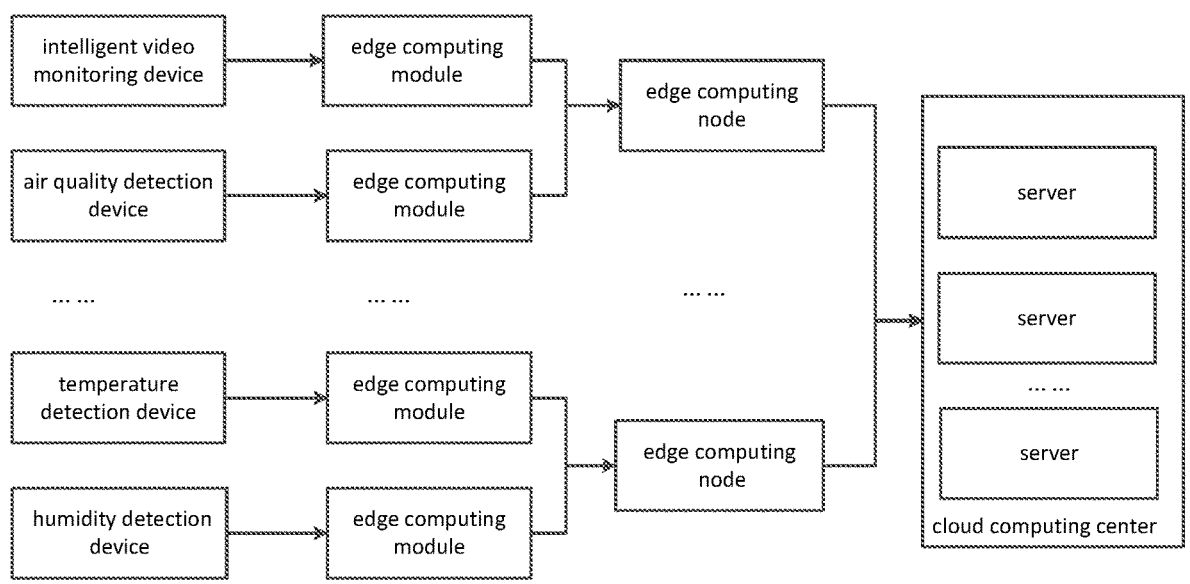

FINE GRANULARITY REAL-TIME SUPERVISION SYSTEM BASED ON EDGE COMPUTING

CROSS REFERENCE TO RELATED APPLICATION

The present application is based upon and claims priority to Chinese Application No. 2020108250208, filed on Aug. 17, 2020, and entitled "fine granularity real-time supervision system based on edge computing", the entire contents of which are incorporated herein by reference

TECHNICAL FIELD

The present invention relates to the field of security technology, and in particular to a fine granularity real-time supervision system based on edge computing.

BACKGROUND ART

As an important measure to strengthen social management, the urban monitoring system has become an important means for public security prevention and control and urban management, providing great help to the public security system in dispatching police forces, diverting traffics and maintaining public orders, and meanwhile, it has played a very active role in curbing interface crimes, investigating and solving cases, social security management, ensuring the safety of people's lives and property, improving the level of urban comprehensive management, and creating a stable and harmonious social environment. General on-site monitoring hardware device does not have terminal integration functions, and does not have data verification and edge computing capabilities. In the actual supervision projects, because of the large number of enterprise objects, the supervision projects are complicated, so that the cloud platform often needs to give up certain granularity requirements in actual projects to carry out real-time supervision. With the continuous increase of enterprise object information data and the management requirements on the platform becoming more refined, how to solve the fine degree of the granularity of real-time supervision is a problem that needs to be solved at present.

SUMMARY OF THE INVENTION

The present invention provides a fine granularity real-time supervision system based on edge computing, which reduces the redundant information of the system and realizes fine granularity management.

A fine granularity real-time supervision system based on edge computing is provided in the present application, comprising: an intelligent video monitoring device, an edge computing module, an edge computing node, and a cloud computing center, wherein the intelligent video monitoring device is used to collect monitoring video data in real time, perform image processing on the collected video data, and obtain a processed video stream;

the edge computing module is used to perform preprocessing, moving target detection, target recognition and alarm processing on the processed video stream, and classify and store the video data according to time, and store and send the processed data to the edge computing node;

the edge computing node is used to receive and store data sent by a plurality of edge computing units, and select the corresponding server according to the number of the intelligent video monitoring devices, and send the received data to the corresponding server;

the cloud computing center comprises a plurality of servers to analyze, summarize, monitor, and count data sent by the edge computing node.

Optionally, the edge computing module comprises a video stream preprocessing unit, and the video stream preprocessing unit comprises a frame filter that divides the video stream into a plurality of video frame sequence groups.

Optionally, the video preprocessing unit further comprises a video frame screening unit, and the video frame screening unit is used to extract the target area to be identified from the video frame sequence group.

Optionally, the edge computing module further comprises a video stream analysis and processing module, the video stream analysis and processing module is used to perform the moving target detection on the video stream, extract the position, size and shape of the target, and is also used to perform the target behavior analysis on the video stream to identify the required target from different scenes.

Optionally, the edge computing module further comprises a classification storage unit, and the classification storage unit is used to perform classification storage according to the monitoring scene of the video stream and time.

Optionally, the edge computing module further comprises a fine granularity time control unit, the fine granularity time control unit is used to obtain a user query request comprising a time element, and search for, according to the user query request, the video data from the classification storage unit with time element search.

Optionally, the edge computing module further comprises a fine granularity authority control unit, the fine granularity authority control unit is used to obtain preset user authority information, obtain the currently logged-in user information and user login role, and compare the logged-in user information and user login role with the preset user authority information to determine whether the logged-in user has operation authority. If the user has the operation authority, the user is allowed to operate; and if the user does not have the operation authority, a reminder message is sent to the user.

Optionally, the operation authority comprises viewing videos and downloading videos.

Optionally, the edge computing node comprises a task scheduling module, and the task scheduling module schedules and distributes the tasks uploaded to the server according to different network environments and video stream parameters uploaded by the edge computing module.

The beneficial effects of the present invention are:

The present invention provides a fine granularity real-time supervision system based on edge computing. The video stream collected by the edge device is preprocessed by providing an edge computing module, thereby improving the video analysis speed, reducing the processing and transmission delay, and ensuring the real-time nature of the video stream. The video content is analyzed in real time through the edge computing module, dynamically adjusting the video stream parameters, reducing system redundant information, and reducing the system's storage and transmission requirements; the edge computing node is provided to select the upload server, having a good scheduling characteristics, thereby solving the resource scheduling problem of the edge computing node, and improving the overall performance of the cloud computing center.

BRIEF DESCRIPTION OF THE DRAWINGS

In order to more clearly illustrate the specific embodiments of the present invention or the technical solutions in the prior art, the following will briefly introduce the drawings that need to be used in the description of the specific embodiments or the prior art. In all drawings, similar elements or parts are generally identified by similar reference signs. In the drawings, various elements or parts are not necessarily drawn according to the actual scale.

FIG. 1 shows a structural block diagram of a fine granularity real-time supervision system based on edge computing provided by the first embodiment of the present invention.

DETAIL DESCRIPTIONS OF THE EMBODIMENTS

The technical solutions in the embodiments of the present invention will be described clearly and completely with reference to the accompanying drawings in the embodiments of the present invention. Obviously, the described embodiments are part of the embodiments of the present invention, rather than all of the embodiments. Based on the embodiments of the present invention, all other embodiments obtained by those of ordinary skill in the art without creative effort shall fall within the protection scope of the present invention.

It should be understood that when used in this specification and the claims, the terms "comprising" and "including" indicate the existence of the described features, wholes, steps, operations, elements and/or components, but do not exclude the existence or addition of one or more other features, wholes, steps, operations, elements, components, and/or collections thereof.

It should also be understood that the terms used in this specification of the present invention are only for the purpose of describing specific embodiments and are not intended to limit the present invention. As used in the specification and the claims of the present invention, unless the context clearly indicates otherwise, the singular forms "a", "an" and "the" are intended to comprise plural forms.

It should be further understood that the term "and/or" used in the specification and the claims of the present invention refers to any combination of one or more of the associated listed items and all possible combinations, and comprises these combinations.

As used in this specification and the claims, the term "if" may be interpreted as "when" or "once" or "in response to determination" or "in response to detection" depending on the contexts. Similarly, the phrase "if determining" or "if [described condition or event] is detected" may be interpreted as the meaning of "once determining" or "in response to determination" or "once [described condition or event] is detected" or "in response to detection of [condition or event described]" depending on the contexts.

It should be noted that, unless otherwise specified, the technical or scientific terms used in this application should have the usual meanings understood by those skilled in the art to which the present invention belongs.

FIG. 1 shows a schematic structural diagram of a fine granularity real-time supervision system based on edge computing provided according to the present application, comprising: an intelligent video monitoring device, an edge computing module, an edge computing node, and a cloud computing center, wherein the intelligent video monitoring device is used to collect monitoring video data in real time, perform image processing on the collected video data, and obtain a processed video stream;

the edge computing module is used to perform preprocessing, moving target detection, target recognition and alarm processing on the processed video stream, and classify and store the video data according to time, and store and send the processed data to the edge computing node;

the edge computing node is used to receive and store data sent by a plurality of edge computing units, and select the corresponding server according to the number of the intelligent video monitoring devices, and send the received data to the corresponding server;

the cloud computing center comprises a plurality of servers to analyze, summarize, monitor, and count data sent by the edge computing node.

The embodiment of the present invention provides a fine granularity real-time supervision system based on edge computing.

The video stream collected by the edge device is preprocessed by providing an edge computing module, thereby improving the video analysis speed, reducing the processing and transmission delay, and ensuring the real-time nature of the video stream. The video content is analyzed in real time through the edge computing module, dynamically adjusting the video stream parameters, reducing system redundant information, and reducing the system's storage and transmission requirements; the edge computing node is provided to select the upload server, having a good scheduling characteristics, thereby solving the resource scheduling problem of the edge computing node, and improving the overall performance of the cloud computing center.

In this embodiment, the edge computing module comprises a video stream preprocessing unit, and the video stream preprocessing unit comprises a frame filter that divides the video stream into a plurality of video frame sequence groups. The video preprocessing unit further comprises a video frame screening unit, and the video frame screening unit is used to extract the target area to be identified from the video frame sequence group. The edge computing module divides the video stream into a plurality of video frame sequence groups to accurately extract the target to be identified. For the video frame sequence groups produced by different intelligent video monitoring devices, the frame filter calls API to compute the number of target identifications in the video stream, and runs the frame filtering algorithm in the edge computing module. The number of video frames uploaded to the edge computing node is dynamically adjusted according to the current network condition, and the video frames with a larger target recognition number is uploaded first. In the case of unstable communication bandwidth, the edge computing module may cache the video frame sequence group of a certain period of time, until the upload standard is reached, and transmit the video frame sequence group in sequence. The video frame screening unit may select recognition targets according to different recognition strategies and different scenes.

The edge computing module further comprises a video stream analysis and processing module, the video stream analysis and processing module is used to perform the moving target detection on the video stream, extract the position, size and shape of the target, and is also used to perform the target behavior analysis on the video stream to identify the required target from different scenes. Most intelligent video monitoring devices have fixed positions, less changes in the video background, and target movement.

Therefore, a background-based modeling method is adopted in the target detection stage. This method is suitable for scenes with high real-time requirements. By analyzing the underlying image characteristics of the video frame, the underlying background model is constructed and meanwhile the motion foreground is segmented. Then the foreground is extracted according to the hybrid multi-Gaussian background modeling method to obtain the information such as target position, size, shape and the like, and the refresh rate of the background model is dynamically updated according to the change of the video stream frame rate. In the target recognition stage, the convolutional Neural Networks (CNN) is used to extract the targets that need to be recognized in different scenes.

In this embodiment, the edge computing module further comprises a classification storage unit, and the classification storage unit is used to perform classification storage according to the monitoring scene of the video stream and time. the edge computing module further comprises a fine granularity time control unit, the fine granularity time control unit is used to obtain a user query request comprising a time element, and search for, according to the user query request, the video data from the classification storage unit with time element search. The edge computing module classifies and stores data according to monitoring scenes and time, such that users may quickly query according to time in the later stage. For example, the edge computing module was not provided before, and the data was reported daily, which may only be accurate to a day. In this application, the edge computing module is provided, classified and stored by time, and monitored on local device, which may be accurate to the hour or even minute. Therefore, this embodiment realizes time fine granularity control of the supervision index, and realizes the fined management in time.

In this embodiment, the edge computing module further comprises a fine granularity authority control unit, the fine granularity authority control unit is used to obtain preset user authority information, obtain the currently logged-in user information and user login role, and compare the logged-in user information and user login role with the preset user authority information to determine whether the logged-in user has operation authority. If the user has the operation authority, the user is allowed to operate; and if the user does not have the operation authority, a reminder message is sent to the user. The operation authority comprises viewing videos and downloading videos. In order to achieve accurate management of user authority, a fine granularity authority control unit is provided. By dually restricting the logged-in user information and user login role, the user information and user login role are compared with the preset user authority information to determine whether the logged-in user has operation authority. If the user has the operation authority, the user is allowed to operate; and if the user does not have the operation authority, a reminder message of no operation authority is sent to the user.

The edge computing node comprises a task scheduling module, and the task scheduling module schedules and distributes the tasks uploaded to the server according to different network environments and video stream parameters uploaded by the edge computing module. The edge computing node receives the queue information of the video frame uploaded by the edge computing module, calculates the amount of tasks to be processed as the queue rotates, and generates a schedule table in descending order. This schedule is updated after each upload task of an edge computing module is completed. The task queue is processed in sequence according to the schedule table. For a task with a low weight but close to the deadline, priority scheduling is given to ensure the throughput rate and time delay of the edge computing module. The utilization of the network bandwidth of the edge computing node under heavy traffic conditions may be improved by providing a task scheduling module, thus reducing the computing cost of the cloud computing center, and improving the concurrent performance.

The edge computing module comprises an edge gateway unit, a micro computing unit and a storage unit; the video acquisition device transmits the collected monitoring video information to the micro computing unit, the micro computing unit is used for processing the video data stream acquired by the monitoring probe and pre-processing and uploading the video data stream, thereby reducing the network transmission pressure and the processing pressure of the cloud platform caused by the large amount of video data.

Facing the ever-increasing number of monitoring probes, the amount of video data required to be processed by the cloud platform also explodes The system distributes the partial processing pressure of the cloud platform to the edge node, effectively alleviates the processing pressure of the cloud platform, thereby enabling the cloud platform to have its advantages and perform more functions.

Due to the fact that the traditional intelligent monitoring system is processed in a large amount of data, the information interaction delay is large, the processing time of the cloud platform can be reduced by dispersing the processing pressure, and the real-time performance of the intelligent monitoring system is enhanced.

The task scheduling module includes:

an original task mapping module, receiving input user requirements, setting a structured input format for said user requirements, detecting user requirements and converting them into task unit sets;

a subtask dependency generation module, performing subtask analysis for each task in the task unit set, and the subtask analysis formula converts the task into a workflow in the form of a directed acyclic graph, and multiple tasks within a set time interval to traverse the workflow, get the repeated sub-tasks contained in multiple tasks, and integrate and remove duplicates to form a sub-task workflow;

a dynamic resource monitoring module, monitoring the real-time resource and task status of each edge server, and record it as edge server operation information;

a real-time task scheduling module, matching subtasks with the edge server in real-time mode after receiving the subtask workflow and edge server operation information, and the subtasks are ordered to form a task priority, and the task is scheduled according to the task priority and the subtask ordering sequence.

In further embodiments, the original task mapping module includes:

Receiving input module: setting a structured input format of user needs, the input format including type, resource constraints and allowable delay time, guiding and receiving input user needs;

Type detection module: detects the type of user requirements, so that the original tasks and template tasks in the user requirements share the same type, and the first detection result is obtained;

Constraint detection module: to detect resource constraints in user needs, so that the resource constraints in the original task meet the resource constraints in the template task, and the second detection result is obtained;

Delay detection module: detects the allowable delay time in the user's requirements, so that the running time in the original task meets the expected running time in the template task, and the third detection result is obtained;

Requirement conversion module: When the first detection result, the second detection result, and the third detection result meet the set requirements, after matching the user requirements with the template task set, the task set is converted to generate a task set, otherwise, an error report is returned and cannot be processed User needs.

In further embodiments, the subtask dependency generation module includes:

Task analysis module: Set the time interval to traverse the workflow generated by multiple original task mappings in the task unit set to obtain multiple subtasks of the same type;

Task comparison module: compare subtasks of the same type. If two subtasks are assigned a unified target machine or no target machine is designated, the two subtasks are not merged; if the input, output and parameter indicators of the two subtasks exist If it includes, the two subtasks are not merged; if there is a conflict in the allowable delay time of the original task of the workflow to which the two subtasks belong, the two subtasks are not merged.

In further embodiments, the dynamic resource monitoring module includes:

General monitoring module: monitor the general resource usage of the edge server, the resource usage includes CPU occupancy rate, memory occupancy rate and current task waiting queue;

Specific monitoring module: monitors the unique resource information of the edge server, the resource information includes any one or more of GPS information, device resolution, and camera photography frequency.

In further embodiments, the real-time task scheduling module includes:

Sequence recommendation module: Assign the subtask workflow to the computing server, sort the longest delay time obtained in ascending order, and calculate the recommendation score of each edge server using the resource information and waiting queue of each edge server;

Workflow assignment module: Prioritize the assignment of a single edge server. For workflows with designated edge servers, assign the designated edge server first, otherwise, assign it to the edge server with the first recommendation score; for workflows that do not specify an edge server, The distribution is directly based on the recommendation scores of each edge server.

In further embodiments, real-time task matching scheduling method includes:

The original task mapping step: receiving input user requirements, setting a structured input format for the user requirements, and converting the user requirements into a set of task units after detecting the user requirements;

Subtask dependency generation step: subtask analysis is performed on each task in the task unit set, and the subtask analytical formula converts the task into a workflow in the form of a directed acyclic graph, and multiple tasks within a set time interval To traverse the workflow, get the repeated sub-tasks contained in multiple tasks, and integrate and remove duplicates to form a sub-task workflow;

Dynamic resource monitoring steps: monitor the real-time resource and task status of each edge server, and record it as edge server operation information;

Real-time task scheduling step: After receiving the subtask workflow and edge server operation information, match the subtasks with the edge server in real-time mode, and at the same time order the subtasks to form a task priority, and perform task scheduling according to the task priority and the subtask sequence.

In further embodiments, the original task mapping step includes:

Receiving input step: setting a structured input format for user needs, the input format including type, resource constraints and allowable delay time, guiding and receiving the input user needs;

Type detection step: detect the type type in the user requirement, so that the original task and the template task in the user requirement share the same type type, and obtain the first detection result;

Constraint detection step: detect the resource constraints in the user needs, so that the resource constraints in the original task meet the resource constraints in the template task, and obtain the second detection result;

Delay detection step: detect the allowable delay time in the user's needs, so that the running time in the original task meets the expected running time in the template task, and the third detection result is obtained;

Requirement conversion step: When the first detection result, the second detection result, and the third detection result meet the set requirements, after matching the user requirements with the template task set, the task set is converted to generate a task set, otherwise, an error report is returned and cannot be processed User needs.

In further embodiments, the subtask dependency generating step includes:

Task analysis step: set the time interval to traverse the workflow generated by multiple original task mappings in the task unit set to obtain multiple subtasks of the same type;

Task comparison step: compare subtasks of the same type. If two subtasks are assigned a unified target machine or no target machine is designated, the two subtasks are not merged; if the input, output and parameter indicators of the two subtasks exist If it includes, the two subtasks are not merged; if there is a conflict in the allowable delay time of the original task of the workflow to which the two subtasks belong, the two subtasks are not merged.

In further embodiments, the dynamic resource monitoring step includes:

General monitoring step: monitoring the general resource usage of the edge server, the resource usage including CPU occupancy rate, memory occupancy rate and current task waiting queue;

Specific monitoring step: monitoring the unique resource information of the edge server, the resource information includes any one or more of GPS information, device resolution, and camera photography frequency.

In further embodiments, the real-time task scheduling step includes:

Sequence recommendation step: assign the subtask workflow to the computing server, sort the obtained longest delay time in ascending order, and use the resource information and waiting queue of each edge server to calculate the recommendation score of each edge server;

Workflow allocation steps: Prioritize the allocation of a single edge server. For workflows that have designated edge servers, priority is given to the designated edge server, otherwise, it is assigned to the edge server with the first recommendation score; for workflows that do not specify an edge server, The distribution is directly based on the recommendation scores of each edge server.

Compared with the prior art, the present invention has the following beneficial effects:

The embodiment of the present invention can minimize the average running time of each task as much as possible on the basis of ensuring the normal execution of tasks and satisfying the corresponding restriction conditions in the environment of multiple edge servers, and at the same time enable various resources to be more fully utilized.

The embodiment of the invention can match and schedule real-time tasks based on resource monitoring in multifunctional edge computing scenarios, thereby providing dynamic high-throughput and low-delay task responses for the entire system environment.

Specifically, for task scheduling on the original task set representing user needs in a certain period of time, the original task mapping module needs to be called in turn to convert the generalized original task into a specific task. Collection, call the sub-task dependency generation module to further decompose the task set generated in the previous step into sub-task workflow and merge the repeated tasks, call the dynamic resource monitoring module to obtain the current real-time resource information of each edge server, and finally call the real-time task scheduling module to divide the task The collection is allocated to the appropriate edge server for calculation and response to achieve greater throughput and smaller response delay.

Specifically, it includes the following four modules:

The original task mapping module is to translate the user requirements entered by the system in a preset format into a set of corresponding task units. When the system matches user requirements with a specific template, it needs to detect three user-specified indicators, namely the type, the constraints of various resources, and the running time of the total task. Only when the three requirements are met, the original task is transformed into the task set corresponding to the template;

Subtasks depend on the generation module. For a set of tasks received at a time interval, each task can be regarded as a workflow formed by many subtasks. By analyzing each task subtask, it becomes a directed nothing. Circle graph (DAG), which traverses the workflow (DAG) of multiple tasks in a time interval, so as to find the repeated subtasks contained in multiple tasks, and backward compatible and merge them, thereby reducing the resources of repeated tasks Consumption, speed up effective task allocation;

The dynamic resource monitoring module mainly monitors the real-time resources and task status of each edge server, thereby helping the real-time task scheduling module to make decisions. The monitored information mainly includes the common resources of each edge server, such as CPU occupancy rate, memory occupancy rate and current task waiting queue, etc., as well as resource information specific to each edge server, such as the camera's photo frequency, resolution or GPS of the smart device Information, etc., which are used to reflect the real-time resource and task status of each edge server;

The real-time task scheduling module combines the subtask workflow generated by the original task mapping module and the subtask dependency generation module, and the resource and task queue status of each edge server generated by the dynamic resource monitoring module, to match tasks and edge servers in real-time mode, and Sort tasks and prioritize urgent tasks, thereby effectively increasing system throughput.

In the specific implementation, the original user needs are analyzed through the original task mapping module to understand the task type, required resources and the longest delay time, and map it into a subtask workflow that the system can recognize and execute; the subtasks will be obtained Workflow traversal, when all constraints are met, merge the subtasks that can be merged and reused, thereby simplifying the merging of workflows, and obtaining the final workflow. At the same time, the dynamic resource monitoring module combines the The resource status is obtained and summarized to obtain the real-time resource information of the system; real-time task assignment is carried out in combination with the workflow and the current system resource status, and the dependencies between each task are counted and assigned to the optimal edge server for processing. Complete the task as quickly as possible under the longest time constraint to achieve higher throughput.

Specifically, the method of the embodiment of the present invention comprises the following steps:

Step A, Video acquisition is performed at the moment of the video acquisition layer, and the collected video information is transmitted to the edge computing layer in the form of a data source every 30 seconds.

Step B, The edge computing layer receives the video data stream, first pre-processes the video data, converts the format into a predetermined video format, then performs face image detection, detects whether there is a face region, performs feature point extraction in the face region, and uploads the extracted result to the intelligent determination module to wait for processing results;

Step C, The intelligent judgment module calculates the node computing capability and the database information through the edge computing node to determine the processing capability of the edge computing node; and if it is determined that the current edge computing node can implement the face recognition and behavior determination, send the execution command to the current node, and then the next step jumps to the step D.

If the current node has not enough computing resources, the resource information table is calculated by the maintained upper-layer edge computing resource information table to view the state and the computing capability of the upper-layer computing resource, and if the computing resource with idle compliance with the computing capability presents the application to the upper-layer edge computing server, the next step jumps to step E; if the upper-layer computing resource does not conform to the condition, the computing request is provided to the cloud platform processing module, and the next step jumps to step F.

Step D, After the edge computing layer is connected to the command of the intelligent judgment module, starting to execute a face recognition algorithm and a behavior judgment algorithm, if the person is found to be abnormal or the behavior is abnormal, reporting to the intelligent service module, requesting to start an alarm system, and uploading the result to the cloud platform processing module; if no person is abnormal or the behavior is abnormal, caching the calculation result and uploading the result to the cloud platform processing module.

Step E, After the upper-layer edge computing server receives the request of the intelligent decision module, performing system usage verification, if the system is in an idle state and meeting the computing requirement, performing distributed calculation on the node received by the edge computing layer, and if the person is abnormal or the behavior is abnormal, reporting to the intelligent service module, requesting to start an alarm system, and simultaneously uploading the calculation result to the cloud platform processing module.

Step F, After the cloud platform processing module receives the computing resource request from the intelligent decision module, the edge computing node is required to upload the preprocessed video data source, and meanwhile, the face recognition algorithm and the behavior determination algorithm are executed; if the person is found to be abnormal or the behavior is abnormal, the intelligent service module is reported, and the alarm system is requested to be started; if no person is abnormal or the behavior is abnormal, the calculation result is cached.

Step G, After the intelligent service module receives the abnormal personnel and the abnormal behavior alarm of the edge computing node or the cloud platform processing module, the networking alarm system is started, warning information is sent to the user or the alarm center, and the intelligent system based on the cloud edge collaborative calculation is completed.

In other application scenes, a fine granularity real-time supervision system based on edge computing may further comprise other data collection devices such as air quality detection device, temperature and humidity detection device, and combustible gas detection device. The air quality detection device collects air quality data, the temperature and humidity detection device is used to collect temperature and humidity data, and the combustible gas detection device is used to collect combustible gas, sending the collected data to the edge computing module for local calculation, then using the edge computing node for resource scheduling, and finally, sending it to the cloud computing center for storage and processing, so as to achieve fine granularity managements for the air quality, the temperature and humidity, and the combustible gas detection.

Finally, it should be noted that the above embodiments are only used to illustrate the technical solutions of the present invention, rather than limiting the technical solutions. Although the present invention has been described in detail with reference to the foregoing embodiments, those of ordinary skill in the art should understand: it is still possible to modify the technical solutions described in the foregoing embodiments, or equivalently replace some or all of the technical features; these modifications or replacements do not deviate the essence of the corresponding technical solutions from the scope of the technical solutions of the embodiments of the present invention, and should all be included in the scope of the claims and specification of the present invention.

What is claimed is:

1. A fine granularity real-time supervision system based on edge computing, comprising:
    an intelligent video monitoring device, used to collect monitoring video data in real time, perform image processing on the collected video data, and obtain a processed video stream;
    an edge computing module, used to perform preprocessing, moving target detection, target recognition and alarm processing on the processed video stream, and classify and store the video data according to time, and store and send the processed data to the edge computing node;
    an edge computing node, used to receive and store data sent by a plurality of edge computing units, and select the corresponding server according to the number of the intelligent video monitoring devices, and send the received data to the corresponding server;
    a cloud computing center, comprising a plurality of servers to analyze, summarize, monitor, and count data sent by the edge computing node,
    wherein, the task scheduling module includes:
    an original task mapping module, receiving input user requirements, setting a structured input format for said user requirements, detecting user requirements and converting them into task unit sets;
    a subtask dependency generation module, performing subtask analysis for each task in the task unit set, and the subtask analysis formula converts the task into a workflow in the form of a directed acyclic graph, and multiple tasks within a set time interval to traverse the workflow, get the repeated sub-tasks contained in multiple tasks, and integrate and remove duplicates to form a sub-task workflow;
    a dynamic resource monitoring module, monitoring the real-time resource and task status of each edge server, and record it as edge server operation information;
    a real-time task scheduling module, matching subtasks with the edge server in real-time mode after receiving the subtask workflow and edge server operation information, and the subtasks are ordered to form a task priority, and the task is scheduled according to the task priority and the subtask ordering sequence.

2. The fine granularity real-time supervision system based on edge computing of claim 1, wherein, the real-time task scheduling module the real-time task scheduling module includes:
    a sequence recommendation module, assigning the subtask workflow to the computing server, sorting the longest delay time obtained in ascending order, and calculating the recommendation score of each edge server using the resource information and waiting queue of each edge server;
    a workflow assignment module, prioritizing the assignment of a single edge server, for workflows with designated edge servers, assign the designated edge server first, otherwise, assigning it to the edge server with the first recommendation score; for workflows that do not specify an edge server, assigning based on the recommendation scores of each edge server.

3. The fine granularity real-time supervision system based on edge computing of claim 1, wherein, the subtask dependency generation module includes:
    a task analysis module, setting the time interval to traverse the workflow generated by multiple original task mappings in the task unit set to obtain multiple subtasks of the same type;
    a task comparison module, comparing subtasks with the same type, and processing them according to the principle: if two subtasks are assigned a unified target machine or no target machine is designated, the two subtasks are not merged; if the input, output and parameter indicators of the two subtasks exist if it includes, the two subtasks are not merged; if there is a conflict in the allowable delay time of the original task of the workflow to which the two subtasks belong, the two subtasks are not merged.

4. The fine granularity real-time supervision system based on edge computing of claim 1, wherein, the edge computing node comprises a task scheduling module, and the task scheduling module schedules and distributes the tasks uploaded to the server according to different network environments and video stream parameters uploaded by the edge computing module.

5. The fine granularity real-time supervision system based on edge computing of claim 1, wherein, the edge computing module further comprises a fine granularity time control unit, the fine granularity time control unit is used to obtain a user query request comprising a time element, and search for, according to the user query request, the video data from the classification storage unit with time element search.

6. The fine granularity real-time supervision system based on edge computing of claim 1, wherein, the edge computing module further comprises a fine granularity authority control unit, the fine granularity authority control unit is used to obtain preset user authority information, obtain the currently logged-in user information and user login role, and compare the logged-in user information and user login role with the preset user authority information to determine whether the logged-in user has operation authority; if the user has the operation authority, the user is allowed to operate; and if the user does not have the operation authority, a reminder message is sent to the user.

\* \* \* \* \*